United States Patent
Kapuria et al.

(10) Patent No.: US 10,526,030 B2
(45) Date of Patent: Jan. 7, 2020

(54) CLIMB STRUCTURE FOR A ROBOT

(71) Applicant: THE HI-TECH ROBOTIC SYSTEMZ LTD, Gurugram, Haryana (IN)

(72) Inventors: Anuj Kapuria, Haryana (IN); Sandeep Kumar Sharma, Haryana (IN); Pradyot Kvn, Haryana (IN); Fahad Munawar Azad, Haryana (IN)

(73) Assignee: THE HI-TECH ROBOTIC SYSTEMZ LTD., Gurugram (IN)

( * ) Notice: Subject to any disclaimer, the term of this patent is extended or adjusted under 35 U.S.C. 154(b) by 315 days.

(21) Appl. No.: 15/590,049

(22) Filed: May 9, 2017

(65) Prior Publication Data

US 2017/0327164 A1    Nov. 16, 2017

(30) Foreign Application Priority Data

May 10, 2016    (IN) .............................. 201611016343

(51) Int. Cl.
| | |
|---|---|
| *B62D 57/024* | (2006.01) |
| *B61C 13/04* | (2006.01) |
| *E21C 29/02* | (2006.01) |
| *B61C 11/04* | (2006.01) |

(52) U.S. Cl.
CPC ............ *B62D 57/024* (2013.01); *B61C 11/04* (2013.01); *B61C 13/04* (2013.01); *E21C 29/02* (2013.01)

(58) Field of Classification Search
CPC ....... B62D 57/024; E21C 29/02; B61C 11/04; B61C 13/04

USPC .................................................. 105/29.1, 127
See application file for complete search history.

(56) References Cited

U.S. PATENT DOCUMENTS

| | | | | |
|---|---|---|---|---|
| 3,589,205 A | * | 6/1971 | Radovic | B61C 11/02 105/127 |
| 3,922,970 A | * | 12/1975 | Glastra | B61L 23/005 104/91 |
| 4,082,361 A | * | 4/1978 | Lanfermann | E21C 29/02 105/29.1 |
| 4,186,970 A | * | 2/1980 | Minke | E21C 29/02 105/29.1 |
| 4,353,308 A | * | 10/1982 | Brown | B61B 13/02 104/119 |
| 4,461,512 A | * | 7/1984 | Sirotin | E21C 29/02 105/29.1 |
| 4,524,859 A | * | 6/1985 | Gotte | E21C 29/02 198/735.6 |
| 4,671,186 A | * | 6/1987 | Kunczynski | B61B 5/02 104/168 |
| 4,901,648 A | * | 2/1990 | Moore | B60T 7/126 104/250 |

(Continued)

*Primary Examiner* — Zachary L Kuhfuss
(74) *Attorney, Agent, or Firm* — Law Offices of Steven W. Weinrieb

(57) ABSTRACT

A composite climb structure includes a climber, a horizontal planar structure, and a ramp coupled on to a base plate. The horizontal planar structure and the ramp are collinearly situated on opposite sides of the climber. The climber is pressed by a robotic vehicle moving on to it from the horizontal planar structure, the climber being pressed to a final position, wherein the angle of elevation (BOC) of the climber is same as the angle of elevation of the ramp, thereby facilitating traversal of the robotic vehicle from the horizontal planar structure on to the ramp.

7 Claims, 3 Drawing Sheets

(56) References Cited

U.S. PATENT DOCUMENTS

| | | | | |
|---|---|---|---|---|
| 5,165,348 A | * | 11/1992 | Wakabayashi | B61C 13/04 105/29.1 |
| 5,174,217 A | * | 12/1992 | Wakabayashi | B61C 13/04 104/93 |
| 2017/0327164 A1 | * | 11/2017 | Kapuria | B62D 57/024 |

* cited by examiner

CLIMB STRUCTURE FOR A ROBOT

CROSS REFERENCES TO RELATED APPLICATIONS

This application claims priority of Indian Patent Application No. 201611016343 filed on May 10, 2016, the entire content of which is hereby incorporated by reference.

TECHNICAL FIELD

The present invention, in general relates to a climb structure for a robot. In particular, the present invention relates to a climb structure for an autonomous robot.

BACKGROUND OF THE INVENTION

Various types of robots are known in the art which are employed for a variety of tasks in differing environments. Robots may be autonomous, semi-autonomous, or manually controlled. One kind of robots are robotic vehicles which traverse with the wheels and carry a payload.

Robotic vehicles may be deployed for a number of tasks in different environments. Robotic vehicles may be deployed in warehouses to carry items, in hostile environments for specific missions, or for surveillance purposes.

Specifically, with advances in warehouses automations more and more robotic vehicles are being deployed for moving items in a warehouse or industrial unit from one place to another.

Movement of robotic vehicles in closed environments such as warehouses or industrial units have attracted much attention in recent times due to rapid increase in e-commerce businesses which need efficient and fast mechanisms to cater to ever growing consumer demands for fast delivery of orders.

However, traversing mechanisms for robotic vehicles in state of the art suffers from several limitations. First, some robotic vehicles are capable of moving on a planar surface, such as a floor of a warehouse. These robotic vehicles lack mechanism for climbing any elevation. Other robotic vehicles are capable of climbing elevation but lack mechanisms to carry any payload with them.

Some existing systems have tried to overcome above limitations by deploying two or more sets of robotic vehicles in the warehouse. First set of robotic vehicles navigate on the floor and a second set of robotic vehicles move up and down along vertical rails which connects levels/floors in the warehouse. The first set of robotic vehicles move the material/item/package ("payload") to the vertical rails. The payload is manually transferred to the second set of robotic vehicles which takes the payload to a desired level or floor. As is evident from above this is a cumbersome and time intensive process which also requires manual intervention.

Further, earlier mechanisms or structures provided for climbing an elevation by a robotic vehicle suffered from several limitations such as slippage of wheels of the robotic vehicle on the traversal track, incorrect angle of approach between teethed wheels of the robotic vehicle and a grooved/teethed traversal track.

The present disclosure provides traversal systems and methods for robotic vehicles to overcome above and other limitations of the existing systems.

Objects of the Invention

It is an object of the present invention to provide a composite climb structure for a robotic vehicle.

It is another object of the present invention to provide a composite climb structure that includes a climber to provide correct angle of approach between a robotic vehicle and a traversal track.

It is yet another object of the present invention to provide a composite climb structure to facilitate efficient and cost effective traversal of a robotic vehicle throughout a warehouse including floor and elevated locations such as depositories.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

In an embodiment, the present invention discloses a composite climb structure. The composite climb structure includes a climber, a horizontal structure, and a ramp coupled on to a base plate, wherein the horizontal structure and the ramp are collinearly situated on opposite sides of the climber. The climber is pressed by a robotic vehicle moving on to it from the horizontal structure. The climber is pressed to a final position, wherein the angle of elevation of the climber is same as the angle of elevation of the ramp, thereby facilitating traversal of the robotic vehicle from the horizontal structure on to the ramp.

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF THE DRAWINGS

For a better understanding of the embodiments of the systems and methods described herein, and to show more clearly how they may be carried into effect, reference will now be made, by way of example, to the accompanying drawings, wherein like reference numerals represent like elements/components throughout and wherein.

DETAILED DESCRIPTION

Figure 1:
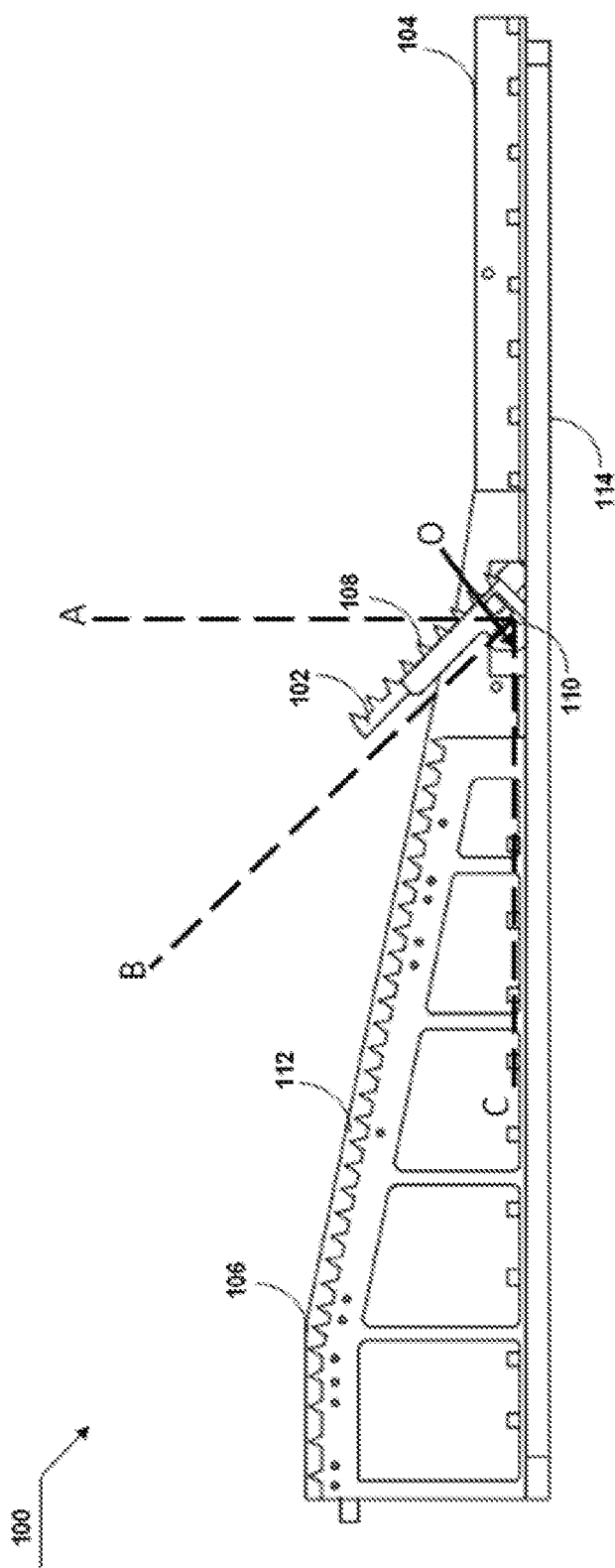
FIG. 1 illustrates a composite climb structure, in accordance with an embodiment of the present invention.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a composite climb composite climb structure 100, in accordance with an embodiment of the present invention. The composite climb structure 100 includes a climber 102, a horizontal structure 104, and a ramp 106 coupled on to a base plate 114. The horizontal structure 104 and the ramp 106 are collinearly situated on opposite sides of the climber 102. The horizontal structure 104, the climber 102, and the ramp 106 may be placed on the base plate 114 in a linear fashion at predetermined distances from one another. The predetermined distances may be based on one or parameters, for example, but not including, height of the ramp 106, length of the climber 102, and a height and shape of the horizontal structure 104.

The base plate 114 may be a planar structure made of hard material such as metal or concrete. The base plate 114 may be in shape of a cuboid having a predetermined height from the ground. The horizontal structure 104, the climber 102, and the ramp 106 may be coupled on the base plate 114 via a coupling mechanism. The coupling mechanism may include, but not limited to bolts, screws, and/or adhesive.

In an alternative embodiment, the composite climb structure 100 may not include the base plate 114. In this embodiment, the horizontal structure 104, the climber 102, and the ramp 106 may be coupled directly on the ground or floor of a warehouse or any facility where the composite climb structure 100 is deployed.

The horizontal structure 104 may include two parallel rail guides. The rail guides may be of same height and configuration and placed at a predetermined distance from each other. The rail guides may be used for movement of a robotic vehicle thereon. The horizontal structure 100 may be made of a hard material. The hard material may be metal or hardened plastic.

The ramp 106 may include two parallel slanted grooved tracks placed at a predetermined distance from each other. The predetermined distance between the parallel tracks may be same as the predetermined distance between the rails guide of the horizontal structure 104, both of which predetermined distances may be based a width of a robotic vehicle.

The climber 102 is coupled in place on to the base plate 114 between the horizontal structure 104 and the ramp 106. The climber 102 may include two identical climbers 102 placed parallel to one another at a predetermined distance from each other. The predetermined distance between the two climbers 102 may be same as the predetermined distance between the parallel tracks of the ramp 106 and the predetermined distance between the rails guide of the horizontal structure 104, all of which predetermined distances may be based a width of a robotic vehicle.

The two climbers 102 may be operated independently or through a common mechanism. When operated independently, each of the climbers 102 may include a separate spring element 110. When operated together, the common mechanism may be a single spring element 110 coupled to both of the climbers 102. In this case, both of the climbers 102 may move about their respective axes simultaneously.

The climber 102 includes a linear member. The linear member may have a free end and a fixed end. The linear member have teeth 108 aligned along one side. The fixed end is coupled tangentially to a spring element 110. The spring element 110 may provide a restoring spring force to the linear member and hold the linear member in position. The linear member is rotatable about an axis passing through the point of attachment or coupling O of the linear member and the spring element 110. The climber 102 is capable of providing a variable angle of elevation BOC.

In another embodiment, the climber 102 includes a linear member coupled to a wheel structure. The linear member may be coupled to the wheel structure in a tangential fashion. The linear member may have a free end and a fixed end. The fixed end is coupled to the wheel structure. The wheel structure may provide a restoring spring force to the linear member and hold the linear member in position. The free end moves along an arc ABC when the fixed end rotates through an angle about an axis passing through the point of attachment or coupling O of the fixed end and the wheel structure.

In an embodiment, the climber 102 is capable of undergoing only rotational motion and that too only through a predetermined range of angles about an axis passing through the point O. The predetermined range may be between zero degrees and ninety degrees. At any moment the angular position AOB of the linear member may be determined with respect to a vertical axis OA that passes through the spring element 110 and is perpendicular to the horizontal structure 104 and the line OC. The angular position AOB of the linear member may be between zero degrees and ninety degrees. In a preferred embodiment, the angular position AOB is between greater than zero degree and an angle of elevation of the ramp 106.

In an embodiment, the spring element 110 holds the linear member in an initial position at a predetermined angle of elevation BOC to the horizontal. The predetermined angle of elevation BOC may be based at least on one of a size of teeth 108 of the linear member and a size of teeth of wheels of a robotic vehicle. The predetermined angle of elevation BOC of the linear member in the initial position may be greater than an angle of elevation of the ramp 106. In an embodiment, the predetermined angle of elevation BOC of the linear member in the initial position may be between zero degrees and ninety degrees.

In an embodiment, the linear member of the climber 102 may be made of a hard material. The hard material may be a metal or hardened plastic. In one embodiment, the linear member may be made of a metallic base and hardened plastic imposed thereon. Further, grooves/teeth may be etched/cut on the linear member.

In an embodiment, the teeth 112 on the ramp 106 and the teeth/grooves 108 on the linear member of the climber 102 may be of same shape and dimension. In one embodiment, the starting height of the ramp 106 may be made equal to the height of the horizontal structure 104.

In one embodiment, there may be more than two climbers 102 placed parallel to one another at predetermined distances from one another. Each of the climbers 102 may be operated independent of others or via a common mechanism. When operated independently, each of the climbers 102 may include a separate spring element 110. When operated through a common mechanism, a single spring element 110 may be coupled to all of the climbers 102. In this case, all of the climbers 102 may move about their respective axes simultaneously. In this embodiment, the ramp 106 and horizontal structure 104 may be adapted to have same number of tracks and same number of rail guides respectively as the number of climbers 102.

Figure 2:
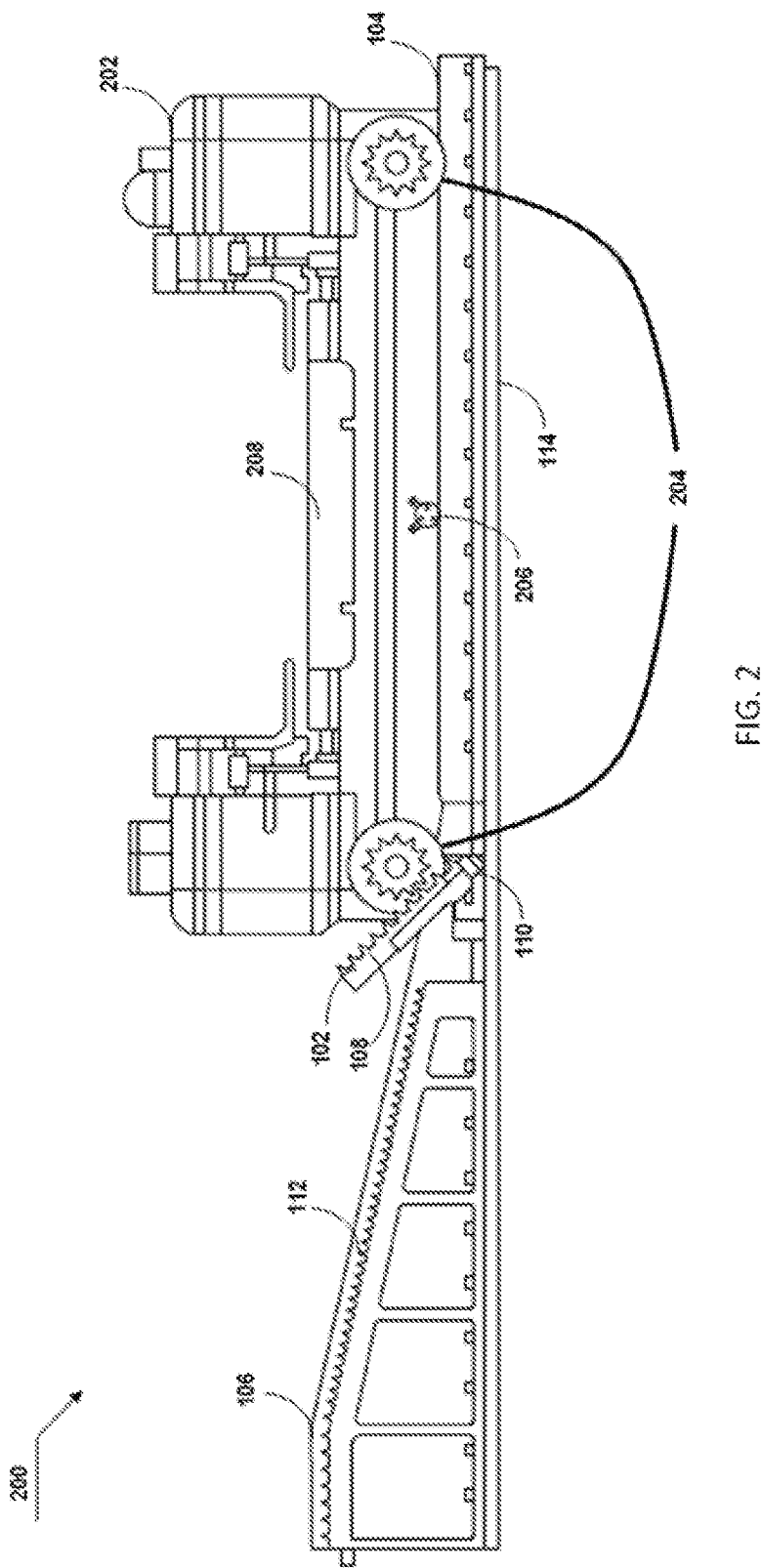
FIG. 2 illustrates a first view of the composite climb structure along with a robotic vehicle thereon, according to an embodiment of the present invention.

FIG. 2 illustrates a first view of the composite climb structure 100 along with a robotic vehicle 202 thereon, according to an embodiment of the present invention.

The robotic vehicle 202 comprises a drive assembly to allow the robotic vehicle 202 to move in a horizontal or vertical direction; a mobile platform 208 to carry a plurality of items; and a control device to control the movement of said drive assembly and the mobile platform 208. The drive assembly comprises two sets of drive wheels and a drive unit to control the movement of the drive wheels. The first set of drive wheels consists of a pair of floor drive wheels 206, which are responsible for motion on the floor; and a second set of drive wheels consists of four timing drive wheels 204, which are responsible for the motion on the grooved tracks of the composite climb structure 100.

When the robotic vehicle 202 is navigating on the floor, both the floor drive wheels 206 are in contact with the floor and all four timing drive wheels 204 are not in contact of the floor. Whereas, when the robotic vehicle 202 is navigating on the ramp 106, then only the four timing drive wheels are in contact with the grooved tracks of the ramp 106.

In one embodiment of the present invention, FIG. 1 merely illustrate a side view of the composite climb structure 100. In fact, the composite climb structure 100 includes at least two such side. One side supports at least two timing drive wheels 204 of the robotic vehicle 202, a front wheel and a rear wheel. The other side similarly supports other pair of timing driving wheels 204 including a front wheel and a rear wheel.

The robotic vehicle 202 moves in direction of line OC, i.e., starting from the horizontal structure 104 to the climber 102 and then to the ramp 106. At a starting moment, the robotic vehicle 202 moves between and along the rail guides of the horizontal structure 104 with support of floor wheels 206. A plurality of castors or idler wheels may keep the robotic vehicle 202 in correct position and orientation as movement between the rail guides is executed. The plurality of castors or idler wheels may run on the rail guides as the floor wheels 206 move on the floor to move the robotic vehicle 202 forward towards the climber 102. At this point, all the timing drive wheels 204 are in air i.e., the wheels 204 do not touch floor or rail guides and are not rotating.

As the robotic vehicle moves further towards the climber 102, there comes a point when pair of front wheels of the wheels 204 comes in contact with the linear member of the climber 102. Until this point, the linear member has been held by the spring element 110 in an initial angular position. The floor wheels 206 keep moving the robotic vehicle forward as the front timing drive wheels 204 engage with the teeth 108 of the linear member.

Figure 3:
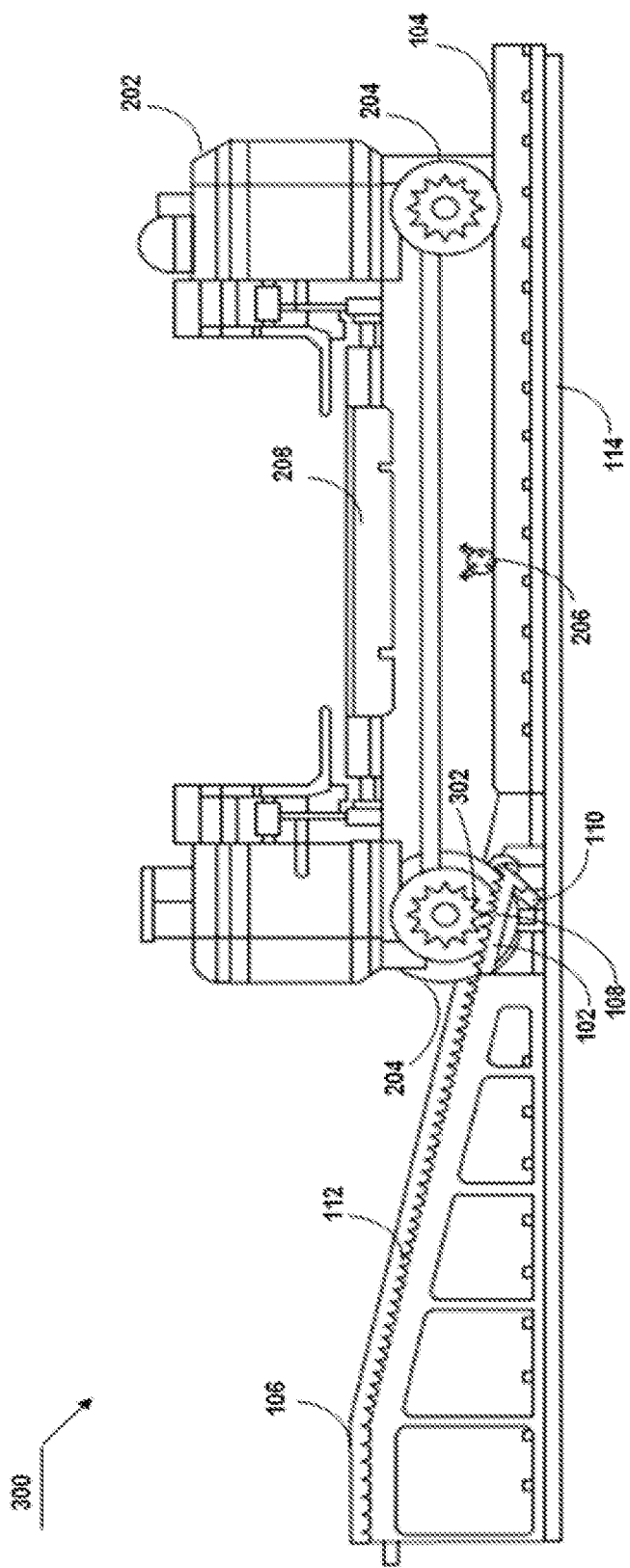
FIG. 3 illustrates a second view of the composite climb structure along with a robotic vehicle thereon, according to an embodiment of the present invention.

The engagement of the linear member of the climber 102 with the timing drive wheels 204 is stable and efficient as the angle of approach and area of teeth engagement is enlarged because of the slanted position of the linear member of the climber 102. The teeth 302 (FIG. 3) of the timing drive wheels 204 are engaged with the teeth 108 of the linear member of the climber 102. As the robotic vehicle 202 moves further towards the climber 102, the timing drive wheels 204 moves along the grooved track of the climber 102. The momentum of the robotic vehicle 202 presses the linear member of the climber 102 away from the vertical axis OA by overcoming the restoring force of the spring element 110. The robotic vehicle 202 moves further on to the climber 102 thereby pressing the climber 102 into a final position as shown in FIG. 3. In the final position, the angle of elevation BOC of the climber 102 is same as the angle of elevation of the ramp 106 thereby facilitating traversal of the robotic vehicle 202 from the climber 102 on to the ramp 106.

FIG. 3 illustrates a second view of the composite climb structure 100 along with a robotic vehicle 202 thereon, according to an embodiment of the present invention. The timing drive wheels 204 have teeth 302 which fit on to the teeth or groves 108 of the climber 102 and the ramp 106. In a final position, the climber 102 is rotated to such an angle so that teeth 108 of the climber 102 and the teeth 112 of the ramp 106 are aligned along a straight line thereby facilitating movement of the robotic vehicle from the climber 102 to the ramp 106. Thus, the process of transition of robotic vehicle 202 from floor to depositories attached to the ramp 106 is complete.

As disclosed above, the present invention provides a composite climb structure 100 for a robotic vehicle 202. The present invention further provides a composite climb structure 100 that includes a climber 102 to provide a correct angle of approach between the robotic vehicle 202 and the ramp 106. The present invention further provides a composite climb structure 100 to facilitate an efficient and cost effective traversal of the robotic vehicle 202 throughout a warehouse including floor and elevated locations such as depositories.

It will be apparent to those having ordinary skill in this art that various modifications and variations may be made to the embodiments disclosed herein, consistent with the present disclosure, without departing from the spirit and scope of the present disclosure. Other embodiments consistent with the present disclosure will become apparent from consideration of the specification and the practice of the description disclosed herein.

We claim:

1. A composite climb structure comprising:
   a climber, wherein the climber comprises at least one linear member comprising a free end and a fixed end and having teeth aligned along one side, the fixed end coupled tangentially to a spring element, the linear member rotatable about an axis passing through the point of attachment (O) of the linear member and the spring element, the climber capable of providing a variable angle of elevation (BOC), wherein the spring element holds the linear member in an initial position at a predetermined angle of elevation, wherein the predetermined angle of elevation is based at least on one of a size of teeth of the linear member and a size of teeth of wheels of a robotic vehicle;

a horizontal structure; and a ramp coupled on to a base plate, wherein the horizontal structure and the ramp are collinearly situated on opposite sides of the climber;

wherein the climber is pressed by the robotic vehicle moving on to the climber from the horizontal structure, the climber being pressed to a final position, wherein the angle of elevation (BOC) of the climber is same as the angle of elevation of the ramp, thereby facilitating traversal of the robotic vehicle from the horizontal structure on to the ramp.

2. The composite climb structure as claimed in claim 1, wherein the predetermined angle of elevation of the linear member in the initial position is between zero degrees and ninety degrees.

3. The composite climb structure as claimed in claim 1, wherein the ramp has teeth aligned on a slanted side of the ramp.

4. The composite climb structure as claimed in claim 1, wherein the teeth on the ramp and the teeth on the climber are of same shape and dimension.

5. The composite climb structure as claimed in claim 1, wherein starting height of the ramp is equal to the height of the horizontal structure.

6. The composite climb structure as claimed in claim 1, wherein the base plate is a floor of a warehouse.

7. A composite climb structure comprising:

a climber;

a horizontal structure; and a ramp coupled on to a base plate, wherein the horizontal structure and the ramp are collinearly situated on opposite sides of the climber;

wherein the climber is pressed by the robotic vehicle moving on to the climber from the horizontal structure, the climber being pressed to a final position, wherein the angle of elevation (BOC) of the climber is same as the angle of elevation of the ramp, thereby facilitating traversal of the robotic vehicle from the horizontal structure on to the ramp; and wherein the predetermined angle of elevation of the linear member in the initial position is greater than an angle of elevation of the ramp.

* * * * *